Nov. 29, 1955 J. R. PHILP 2,725,034
ARTICLE HANGER
Filed Sept. 22, 1954 3 Sheets-Sheet 2
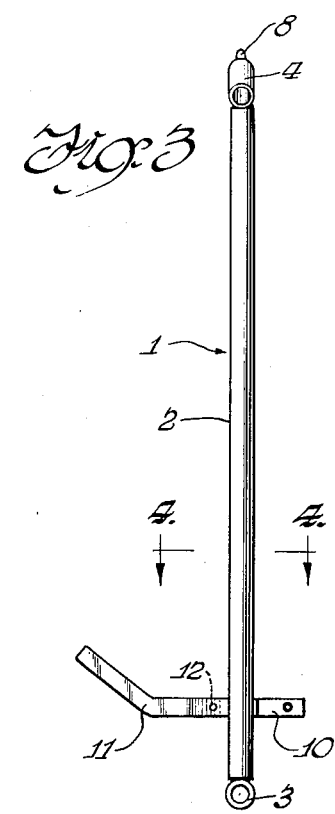
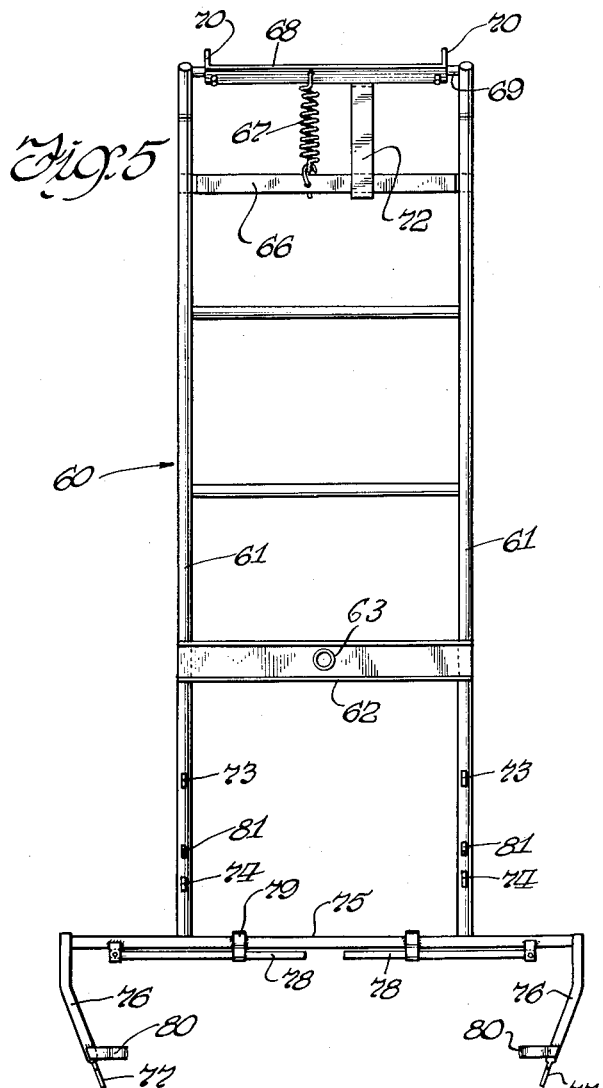
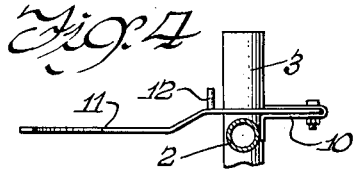
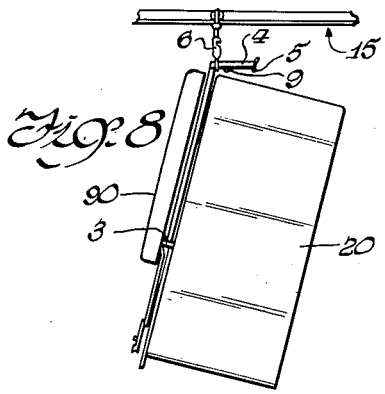
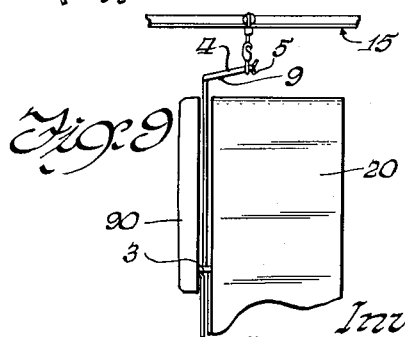
Inventor
James R. Philp
by Andrew G. Hubbard
Attorney

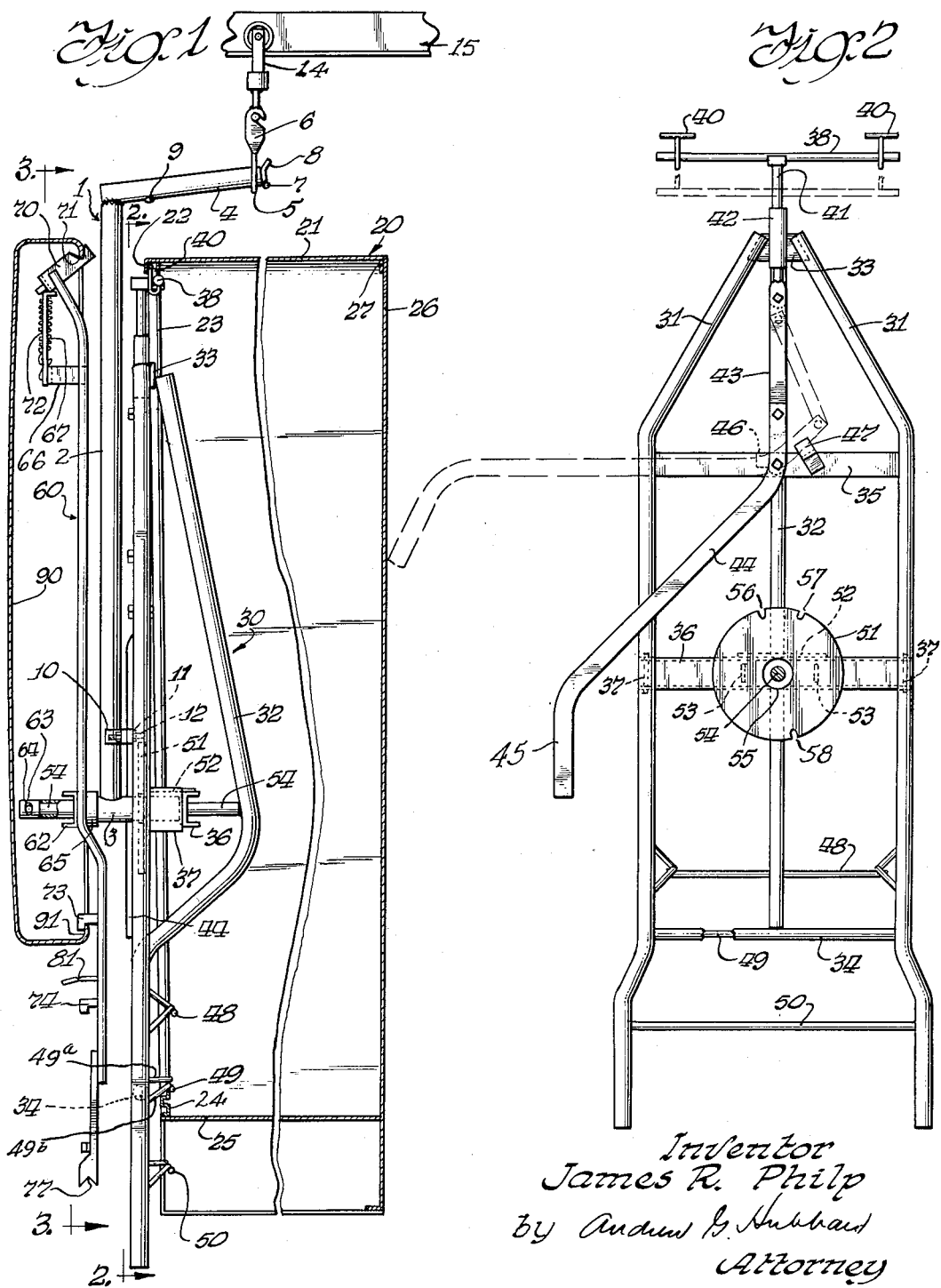

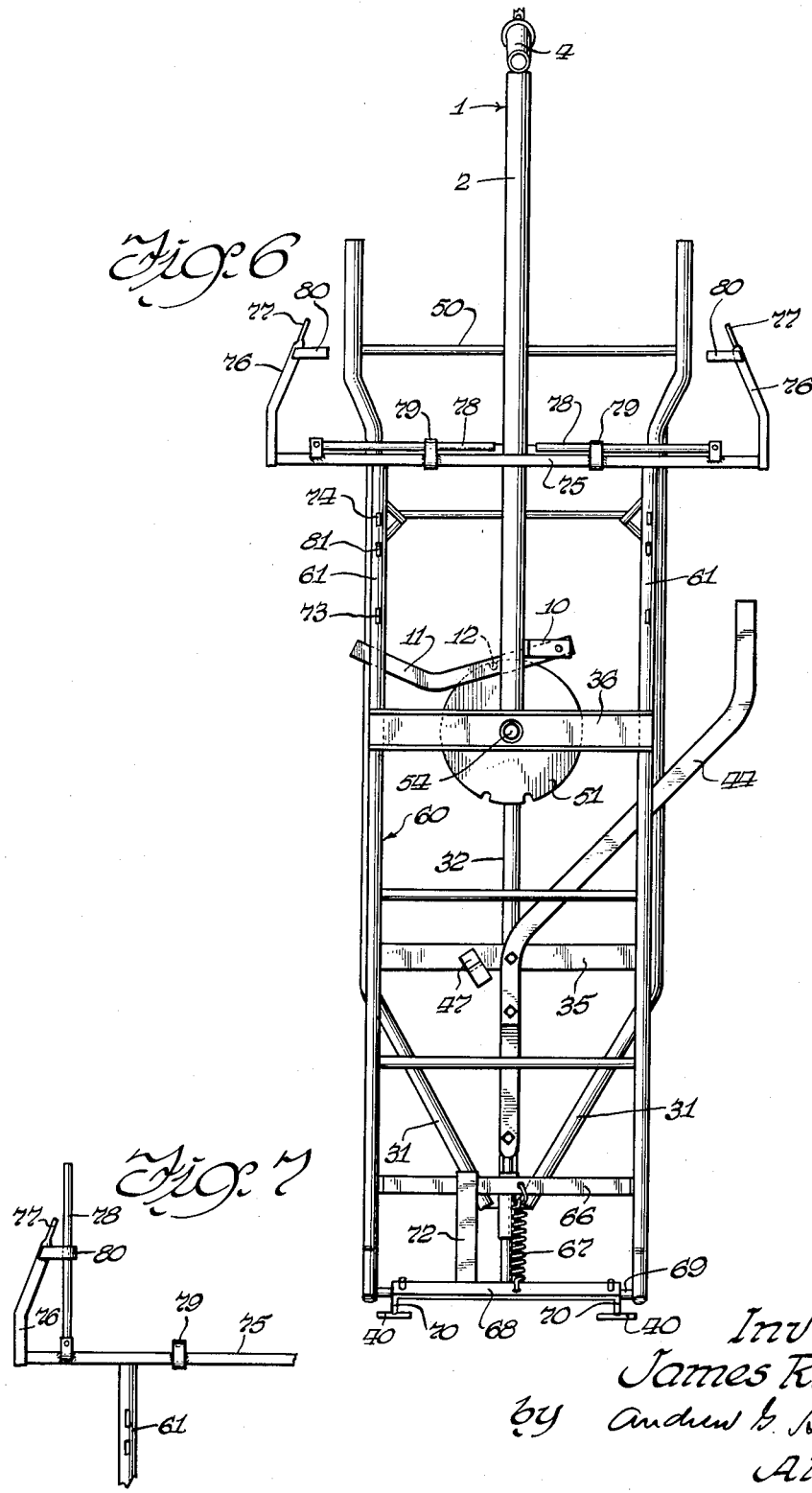

United States Patent Office 2,725,034
Patented Nov. 29, 1955

2,725,034

ARTICLE HANGER

James R. Philp, Villa Park, Ill., assignor to General Electric Company, a corporation of New York Application September 22, 1954, Serial No. 457,681

8 Claims. (Cl. 118—500)

This invention relates to a hanger on which to mount articles which are to be given surface treatment such as painting, sand-blasting and the like.

A hanger constructed according to the invention is particularly advantageous in the manufacture of relatively large sheet metal appliances such as refrigerators, in which the cabinet and doors are finished with particular care in order for the metal to be adequately protected and the finished product have an unblemished and highly attractive appearance. Cabinets and doors which are to receive organic finishes such as resin-base enamels are especially carefully sanded and cleaned in preparation for the two or more enamel coats, and the manual operations of skilled workmen in giving the articles final sanding or other attention must be done while the articles are being transported on a conveyor line. In a typical finishing process, the first coat of enamel is often applied pursuant "flow-coating" technique in which relatively low viscosity enamel is heavily applied by pressure streams directed against various surface portions of the article. The excess of this coating is permitted to drip from the articles, and the articles then passed through a drying chamber. After the first coat has thoroughly dried, inspectors along the conveyor line examine the coating for imperfections and take such action as is indicated. This may include light sanding of rough spots, or other surface treatment, and frequently requires the cabinet and associated parts to be rotated or inverted so that all portions of said cabinet parts may be made available for attention. Therefore, it is important that the hanger on which the cabinet and parts are carried be capable of securely mounting the articles so that they may be easily manually rotated, inverted and the like without permitting the articles to shift or to become detached from the carrier. Thereafter the cabinet and parts go to a finish-coat spray booth, and prior thereto, it may be necessary for workmen again to rotate or otherwise position the articles for best exposure to the paint applicators in the spray booth.

It is therefore an object of the invention to provide a hanger for refrigerator cabinets, cabinet doors and the like which will hold them securely during passage through the several surface preparation and enamelling operations and permit the operators easily to swing, rotate and invert the cabinets as necessary.

It is another object of the invention to provide a hanger for refrigerator cabinets and the like which is readily adaptable to cabinets of various sizes.

It is a further object of the invention to provide a hanger on which the articles may be quickly and easily positioned, and from which they may be easily removed.

Other features and advantages of the invention will be apparent from the following detailed description of a presently preferred embodiment thereof, read in connection with the accompanying drawings in which:

Fig. 1 is a side elevation of a hanger constructed according to the invention showing in vertical section a portion of a refrigerator cabinet and a refrigerator door mounted thereon;

Fig. 2 is a front elevational view of the cabinet carrier portion thereof, looking in the direction of the arrows 2—2 of Fig. 1;

Fig. 3 is a front elevational view of the main support structure, looking in the direction of the arrows 3—3 of Fig. 1;

Fig. 4 is a plan section of the main support structure, looking in the direction of the arrows 4—4 of Fig. 3;

Fig. 5 is a front elevational view of the door carrier portion of the hanger;

Fig. 6 is a front elevational view of the complete apparatus in which the respective carriers have been swung through 180° in a vertical plane, as respects Fig. 2;

Fig. 7 is a fragmentary front elevation of the door carrier with additional carrier members in an operative position permitted by the positioning of the hanger, as described in Fig. 6;

Fig. 8 is a fragmentary elevation of the hanger with refrigerator cabinet and door thereon showing the angle of carriage which results from placing the support hook at one position on the main support structure; and Fig. 9 is a similar view showing the angle of carriage resulting from placing the support hook at a second position on the main support structure.

Referring to Fig. 1, a hanger constructed according to the invention comprises a main support member 1, a first article carrier 30, and a second article carrier 60. Main support member 1 includes a rigid, preferable tubular strut 2, having securely welded to bottom end thereof the sleeve 3 which forms a support bearing for the other carrier members, as later described. At the upper end of the strut there is welded thereto a bar 4 which slidably accommodates the looped portion 5 of the hook 6. Preferably the loop 5 is permanently maintained on the bar as by the cross piece 7 and tab 8 welded across the end of said bar. At an intermediate point of the underside of the bar, there is welded a small button 9; and it will be understood that there is sufficient play between the bar and the loop 5 to permit the loop to pass over the button 9, as later described. Bar 4 is preferably inclined upwardly from the horizontal; for example, it has a 10° upward slope. A pivot plate 10 is welded to the lower portion of the strut 2, as best shown in Figs. 3 and 4. Said plate pivotally supports a latching lever 11, having an indexing pin 12.

Hook 6 permits the structure to be removably attached to a conventional swivel hanger 14 of an overhead conveyor 15. The conveyor and swivel hanger may be of any standard construction.

The first named article carrier in the illustrated embodiment of the invention is adapted to accommodate a bulky, relatively heavy article such as the outer casing 20 of a refrigerator cabinet. In passing, it might be noted that the usual refrigerator cabinet comprises the outer casing and an inner shell or liner with thermal insulation placed therebetween. This outer casing is usually given a two coat organic enamel finish. The present invention will be described in connection with the enamelling of the outer casing of the refrigerator cabinet and door.

The cabinet casing 20 is of sheet metal construction in which a single panel 21 forms the top and side walls. Said panel has an inwardly turned front flange 22 and a second inwardly extending flange 23 spaced rearwardly of flange 22. A channel member 24 extends across the lower portion of the cabinet, being secured to the respective flanges 22 and 23, and a transversely extending bottom panel 25 is welded to the cross member and to certain side wall members (not shown). A rear cabinet wall 26 is welded to a rear marginal flange 27. There is thus formed a relatively heavy, deep cabinet shell having front, top, and side wall portions suitably stiffened to receive door hinges and latches (not shown) for the secure mounting of the cabinet door. As is well known, refrigerators are made in several sizes which are expressed in cubic feet of available storage capacity. The depth of a refrigerator cabinet is usually standardized by a manufacturer for all of the sizes he manufactures; and accordingly, the various sizes require different height and/or width of the cabinets. The carrier 30 is adaptable to all cabinet widths and to three cabinet heights. The depth of the cabinet is immaterial.

Referring now to Fig. 2, carrier 30 comprises a rigid framework having side members 31 and a central vertical member 32 secured together at an upper plate 33 and by a lower cross piece 34. Cross pieces 35 and 36 join only the two outer members of 31, for it will be observed in Fig. 1 that the vertical member 32 is rearwardly arched to provide a truss-like structure. Member 35 is preferably a simple flat, rigid plate, whereas member 36 is advantageously a channel secured to the members 31 by rigid spacer plates 37. It will be noted from Fig. 1 that whereas the side members 31 are welded to the front of plate 33, member 32 is welded to the rear thereof.

Means are provided for releasably engaging the upper wall of the cabinet between the marginal flanges 22 and 23 thereof. Conveniently, this engagement means may comprise a cross bar 38 having adjacent its ends forwardly-offset T-shaped fingers 40 rigidly secured thereto. As best shown in Fig. 1, the upper cross bar of said fingers 40 fit between the flanges 22 and 23, with the cross bar 38 below and rearwardly of flange 23. The cross bar 38 is arranged to be vertically displaced and latched in raised position by a toggle mechanism. As best shown in Fig. 2, cross bar 38 is rigidly mounted on a support post 41 which slidably extends through a sleeve 42 welded to plate 33. Said post 41 is pivotally attached to the forked end of a rigid link 43, which in turn is pivotally attached to a toggle lever 44. Lever 44 is pivoted to cross piece 35 and its handle portion 45 is offset to make the handle readily accessible at the side of the carrier. A stop 46 is engaged by lever 44 when the lever has been rotated counter-clockwise of Fig. 2 to its maximum position; and in said position, the link 43 is overthrown slightly to the left of Fig. 2 and the cross bar 38 will support its load without danger of collapse of the link and lever. A stop or latch 47 fastened to cross piece 35 establishes the maximum lowered position of cross bar 38, in which position the handle 45 will occupy the broken line position of Fig. 2. For cooperation with cross bar 38 in the support of the cabinet, there are provided three transverse members, respectively 48, 49, 50, each of which is supported in spaced relation to the rear of carrier 30 by welded supports, such as shown at 49a and 49b in Fig. 1. It will be noted that the side members 31 are spread at their lower ends, whereby member 50 will accommodate the wider cabinets of the larger refrigerators. When refrigerator casing 21 is engaged by the fingers 40 in operating position, the upper edge of the cabinet cross member 24 will rest against the support 49b at each side of the carrier and the said supports and the transverse member 49 form a notch from which the cross member 24 cannot escape so long as the upper support bar 38 is in its upper home position. It will be understood of course that the shorter cabinets of smaller refrigerators will be secured by the member 48, and the longer cabinets of the largest refrigerators will be secured by the member 50.

An indexing plate 51 is rigidly secured to the carrier 30 as by a member 52 welded to the upper flange of channel 36 and extending forwardly to the rear of plate 51 to which it is welded. Additional support for said plate may be provided by the supports 53 welded to the web of channel 36 and to the rear of plate 51. A pivot post 54 is welded to member 32 and to the web of channel 36; said post extends through a large opening 55 in plate 51 and projects through the sleeve 3 to form a support on which the carrier member 60 is rotatably mounted, as presently described. Plate 51 has a plurality of indexing notches 56, 57 and 58. It will be noted from Fig. 1 that sleeve 3 is the main support structure for the respective carriers 30 and 60 and that for additional supporting effect, the sleeve 3 passes freely through the opening 55 in plate 51 and abuts the web of channel 36.

The carrier 60 is advantageously a substantially rectangular structure having side rails 61 secured together by appropriate cross pieces. One of said cross pieces includes the channel 62 having welded to the forward wall of its web portion a sleeve 63 which rotatably receives the forward end of the pivot post 54 of carrier 30. As appears in Fig. 1, the outermost end of sleeve 63 has an elongated opening 64 which registers with a round hole through the pivot post 54. By means of a cotter pin or other similar device, the carrier 60 is thereby supported against accidental removal from post 54 but is permitted a relative rotation of a few degrees with respect to the carrier 30. The rear face of the web of channel 62 is provided with a sleeve 65 which telescopes relatively loosely over the sleeve 3 of the main support structure when the carriers are in position thereon.

An upper cross member 66 is secured to the rails 61 and projects forwardly thereof, as best appears in Fig. 1. Said cross member serves as an anchor for a coil spring 67 which at its upper end is attached to an angle-shaped cross member 68 which is pivotally mounted on the side members 61, as by the rotatable engagement with short pintles 69 on said side members. The rearwardly extending walls 70 of the pivoted cross member 68 are formed with notches 71. A stop 72 fixed to the cross member 66 serves to limit the counterclockwise rotation of the arm members 70 under the urging of spring 67. It will be noted from Fig. 1 that said spring and stop member serve normally to incline the members 70 upwardly. Near their lower portion the side members 61 are provided with pairs of rigid hook members, respectively 73 and 74, which have downwardly looking hook portions. A lower cross member 75 rigidly secured to the side members 61 extends laterally of said side members, as shown in Fig. 5, and at the ends thereof there are provided downwardly and inwardly extending support members 76, each of which terminates in a downwardly facing rigid hook 77. Near the respective ends of the cross member 75, I pivotally attach bars 78; and for cooperation therewith, I apply to the bar 75 latch members 79 which releasably hold the rods 78 in a raised position, as shown in Fig. 5. To the lower ends of the support members 76, I affix other latches 80 which will maintain the rods 78 in a second position, best shown in Fig. 7. For convenience in mounting any other small parts, carrier 60 may have various other projections such as the fingers 81.

As illustrated in Fig. 1, carrier 60 is adapted for the releasable securement of the cabinet door 90. Such doors usually comprise a relatively deeply drawn panel having the inwardly turned peripheral flange 91. The locations of the hook members 73, 74, and 77 correspond to the door lengths for various refrigerator cabinet sizes and types. The relatively wide spacing of the lower hooks 77 is consistent with the similar spacing of the bottom support member 50 of carrier 30 and improves stability of the largest size door which is usually wider, as well as longer, than the intermediate sizes.

It will be obvious that in the completely assembled hanger structure, the carrier 30 and its associated carrier 60 may be placed in any one of three angular positions relative to the support structure 1. In the relationship Figs. 1 and 2 for example, hanger 30 is substantially plumb with respect to the support structure. Pin 12 of lever 11 is seated in notch 56 of the indexing plate 51. Carrier 60 may be slightly rotated relative to carrier 30 by reason of the play provided by slot 64 in sleeve 63. Carrier 30 may be angularly displaced relative to support structure 1 by raising lever 11 to remove pin 12 from the notch, manually rotating the carrier, and dropping the pin into another notch. If only a partial displacement is required, the carrier may be rotated until notch 57 is in registry with the pin; if it is desired to rotate carrier 30 a full 180° from the Fig. 2 position, it will be maintained in such inverted position by the seating of pin 12 in slot 58. Obviously, in each instance, carrier 60, being manually associated with carrier 30, rotates with it. Other intermediate positions of carriers 30 and 60 may be provided for by the addition of other appropriately positioned notches in plate 51.

It is a simple matter for the workmen to place the cabinet and door on the hanger as it is being transported by the moving conveyor. Working from the rear, two men lift the cabinet and hook flange 22 thereof over the T-members 40. It will be understood that the support bar 38 is then in its lowered position. The cabinet will assume a normal position in which its lower cross member 24 engages beneath the cross member 49 of the carrier 30. An operator then throws the toggle lever 45 to raise the cabinet to its locked position on the carrier 30. Meanwhile, another operator has lifted the relatively light door 90 and has hooked its flange 91 into notch 71. He then draws the door downwardly until the bottom flange of the door fits over the hooks 73. Releasing the door, the reaction of spring 67 causes the door to be firmly clamped between its upper and lower flange portions.

Assuming that the cabinet and door are to be processed and "flow-coated" with the first coat of enamel, it is desirable to have the articles hang at an angle to facilitate drippage. Accordingly, at this stage of the operation, the hook is placed at the extreme left of the bar 4, as viewed in Fig. 1; in other words, the loop 5 is confined between post 2 and button 9. The center of gravity of the assembly is in such relation to this position of the loop 5 that the whole assembly will swing in a clockwise direction to a final position indicated in Fig. 8.

The conveyor then conducts the assembly through the usual washing and surface treating baths and sprays (not shown). After the cabinet and door are dried, the conveyor enters the "flow-coating" chamber (not shown) in which pressure streams of low viscosity enamel strike the cabinet and door from various locations and directions and the outside and inside of the cabinet and door are coated. Because of the incline of the cabinet and door, the surplus enamel drips therefrom. It will be understood that various drainage openings (not shown) are provided in the cabinet and door to insure complete drainage.

The articles are then oven dried and eventually reach a station at which inspectors examine the articles for surface imperfections. The facility with which the cabinet and door may be rotated while remaining on the hanger makes it possible for the inspectors to study all portions of the articles and to give them such "touch up" or other treatment as appears necessary.

The next operational treatment ordinarily comprises giving the articles the finish coat of enamel. In modern manufacturing plants, the finish coat is ordinarily automatically applied in an electrostatic spray booth, and in order to prevent loss of paint by passage between the initially relatively widely spaced hangers, the conveyor as it enters the electrostatic booth "bunches" the hangers so that the cabinet and door on one hanger is only a few inches away from the cabinet and door on the next succeeding hanger. This obviously requires that the articles be in an upright position, and before a cabinet reaches the "bunching" portion of the conveyor, an operator adjusts the hanger on the loop 5 so that said loop is at the extreme right-hand portion of the bar 4, as indicated in Fig. 1. The center of gravity will then be such that the hanger will assume a normally vertical position (see Fig. 9) and the close relationship of the adjacent hangers following the "bunching" operation will be without danger of one cabinet or door striking an article on an adjacent hanger.

Depending on the positioning and disposition of the paint spray heads in the electrostatic finish-coat booth, it may be necessary or desirable to invert the articles from the Fig. 2 position by rotating the carriers 180°, as previously described. This operation would then position the cross bar 75 of hanger 60 at the top, whereupon the bars 78 may be rotated to the position shown in Fig. 7, in which position they are available for supporting any small articles which had previously been given a first coat of enamel.

Following passage through the electrostatic spray booth and subsequent drying chambers, the cabinets and doors are ready for removal from the hangers at some other manufacturing station. This is obviously easily accomplished by again rotating the carriers to their Fig. 1 position (if a previous inversion of the carriers had been made) and swinging lever 45 clockwise, as viewed in Fig. 2, to lower the cross member 38. This obviously disengages the cabinet cross member 24 from its carrier hook member 49 and permits operators to remove the cabinet from the hanger. Another operator may easily remove the door 90 from the carrier 60 by pulling downwardly on the door to free the bottom flange 91 relative to the hooks 77 and then lifting the door from the carrier.

While there has been described what is at present considered to be the preferred embodiment of the invention, it will be understood that various modifications may be made therein, and it is intended to cover in the appended claims all such modifications as fall within the true spirit and scope of the invention.

I claim:

1. A hanger, comprising a main support member having means for suspension from a fixture, a first article carrier disposed on one side of said main support member, means including a shaft on said article carrier and a journal on said support member for rotatably mounting said article carrier on said support member, means for releasably securing said article carrier in one of several angular positions relative to said main support member, a second article carrier disposed on the opposite side of said main support member, means on said second article carrier for securing said carrier on said shaft for rotation therewith, and means on each of said article carriers for releasably securing an article thereon.

2. A hanger according to claim 1, in which the means for angularly positioning said first article carrier relative to said main support member includes an indexing plate secured to said article carrier, said plate having a plurality of openings therein, a lever on said main support member, and pin means on said lever for entry into one of said openings upon rotation of said article carrier to bring said opening into registry with said pin means.

3. A hanger according to claim 1, in which the means for securing said second article carrier on said shaft includes a pin and slot relationship permitting predetermined rotation of said second carrier about said shaft.

4. A hanger, comprising a main support member having means for suspension from a fixture, a first article carrier disposed on one side of said main support member, means including a shaft fixed to said article carrier and a journal fixed to said main support member for rotatably receiving said shaft, whereby said article carrier is rotatably mounted on one side of said support member, hook means on said article carrier on one side of said shaft, hook means on said carrier on the opposite side of said shaft, means mounting said last named hook means for displacement laterally of said carrier, means including a toggle mechanism for effecting displacement of said last named hook means and for releasably securing said hook means at a fixed location relative to said shaft, a second article carrier pivotally mounted on said shaft on the opposite side of said support member, hook means on said second article carrier on one side of said shaft, a second hook means on said second article carrier on the opposite side of said shaft, means for pivotally attaching said second hook means to said carrier, spring means for urging said second hook means into a fixed angular relation to said second carrier, means for securing said second carrier to said shaft, whereby said first and second article carriers may be conjointly rotated relative to said main support member, and means for releasably securing said carriers in an angularly displaced position relative to said support member.

5. A hanger, comprising a main support member including a strut and a rigid member fixed to one end thereof in angular relation therewith, a hook member slidably carried on said rigid member for suspending said support member from a fixture, means for maintaining said hook member optionally in either of two positions relative to said strut, a cylindrical sleeve secured to the opposite end of said strut and extending substantially normal thereto, a first article carrier, a shaft fixed to said article carrier and extending therefrom through said sleeve for rotatably mounting said carrier for rotation in a plane substantially parallel to said strut, means including an indexing plate on said first article carrier and latching means on said main support member for establishing a predetermined angular position of said carrier relative to said strut, hook means disposed near the opposite ends of said carrier for mutually cooperating in the support of an article positioned on said carrier, a second carrier comprising a substantially rectangular framework, sleeve means on said framework for mounting said second carrier on said shaft in substantial parallelism with said first carrier, means for securing said second carrier on said shaft for conjoint rotation therewith, and hook means on said second carrier near the opposite ends thereof for mutually cooperating in the support of an article on said second carrier.

6. A hanger according to claim 5, in which said rigid member comprises a bar and said hook member includes a loop portion slidably encircling said bar.

7. A hanger according to claim 5, in which the hook means disposed near one end of said first carrier are mounted for displacement longitudinally of said carrier, and toggle means are provided for displacing said hook means and latching the same in a fixed position.

8. A hanger according to claim 5, in which the hook means disposed near one end of said second carrier are resiliently mounted for normal movement away from the opposite-end hook means of said carrier, whereby an article engaging and extending between the respective hook means may be clamped therebetween by the effort of said resiliently mounted hook means to move away from said opposite-end means.

References Cited in the file of this patent

UNITED STATES PATENTS 795,390    Haeske et al. _____ July 25, 1905